United States Patent Office 3,521,458
Patented July 21, 1970

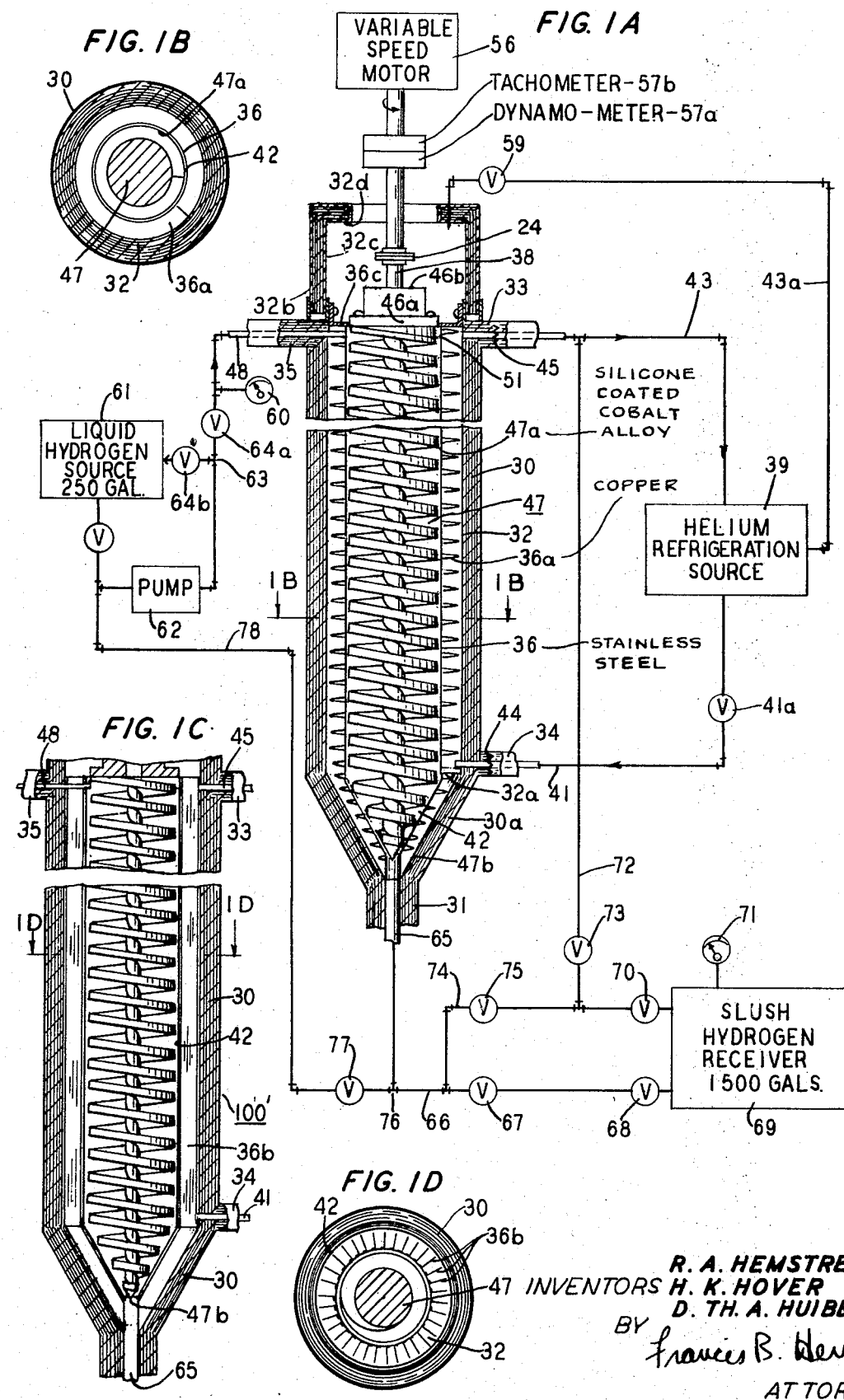

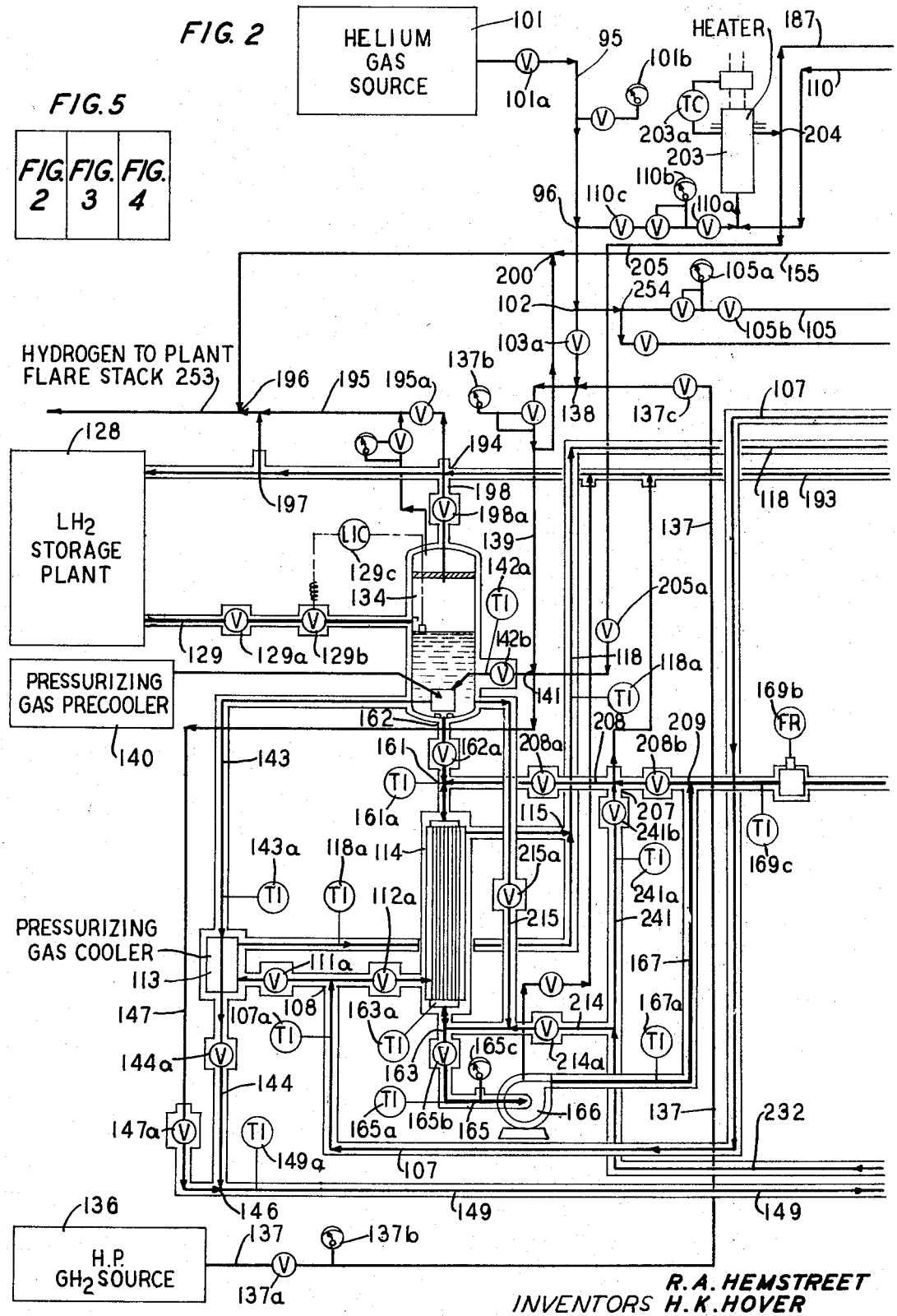

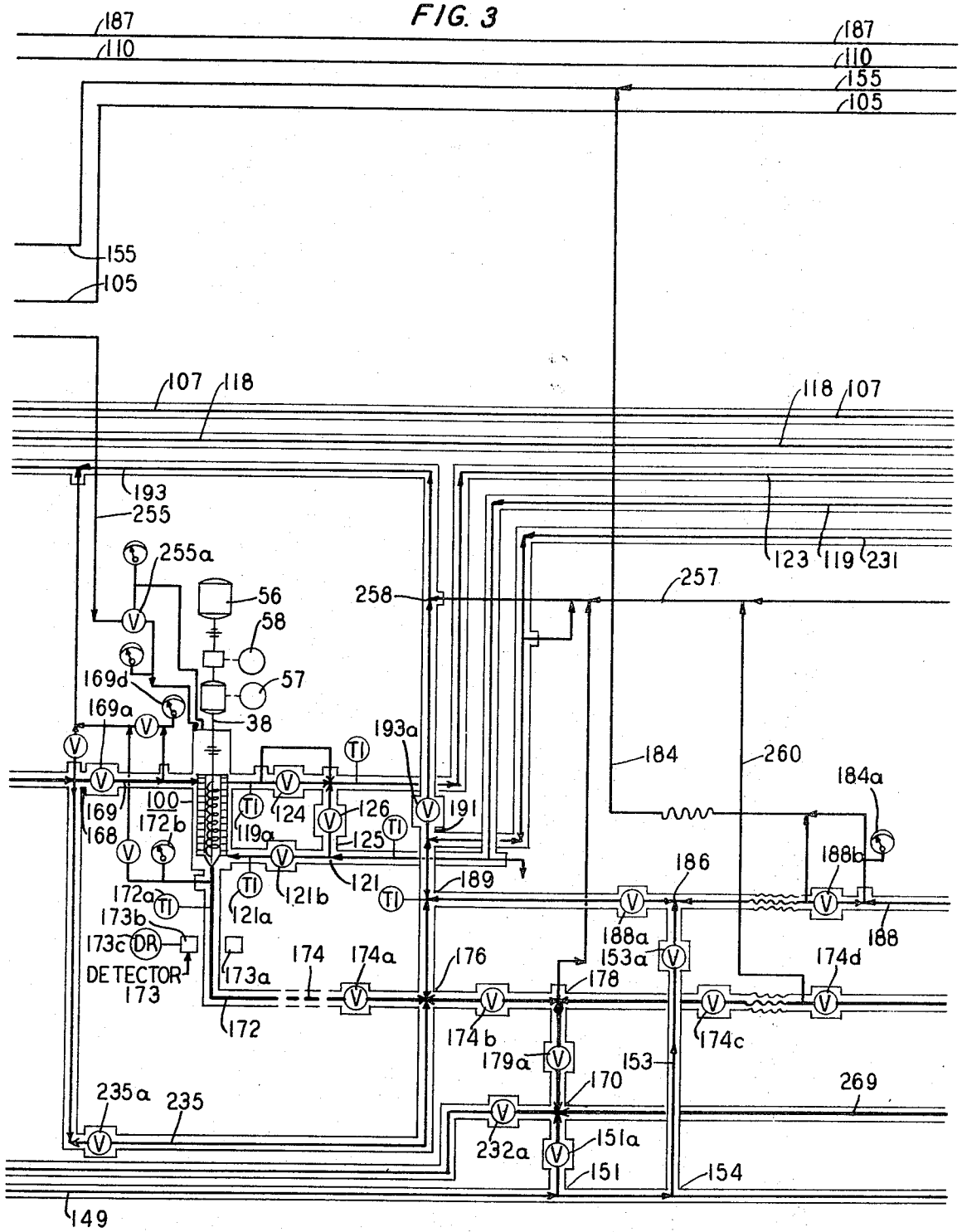

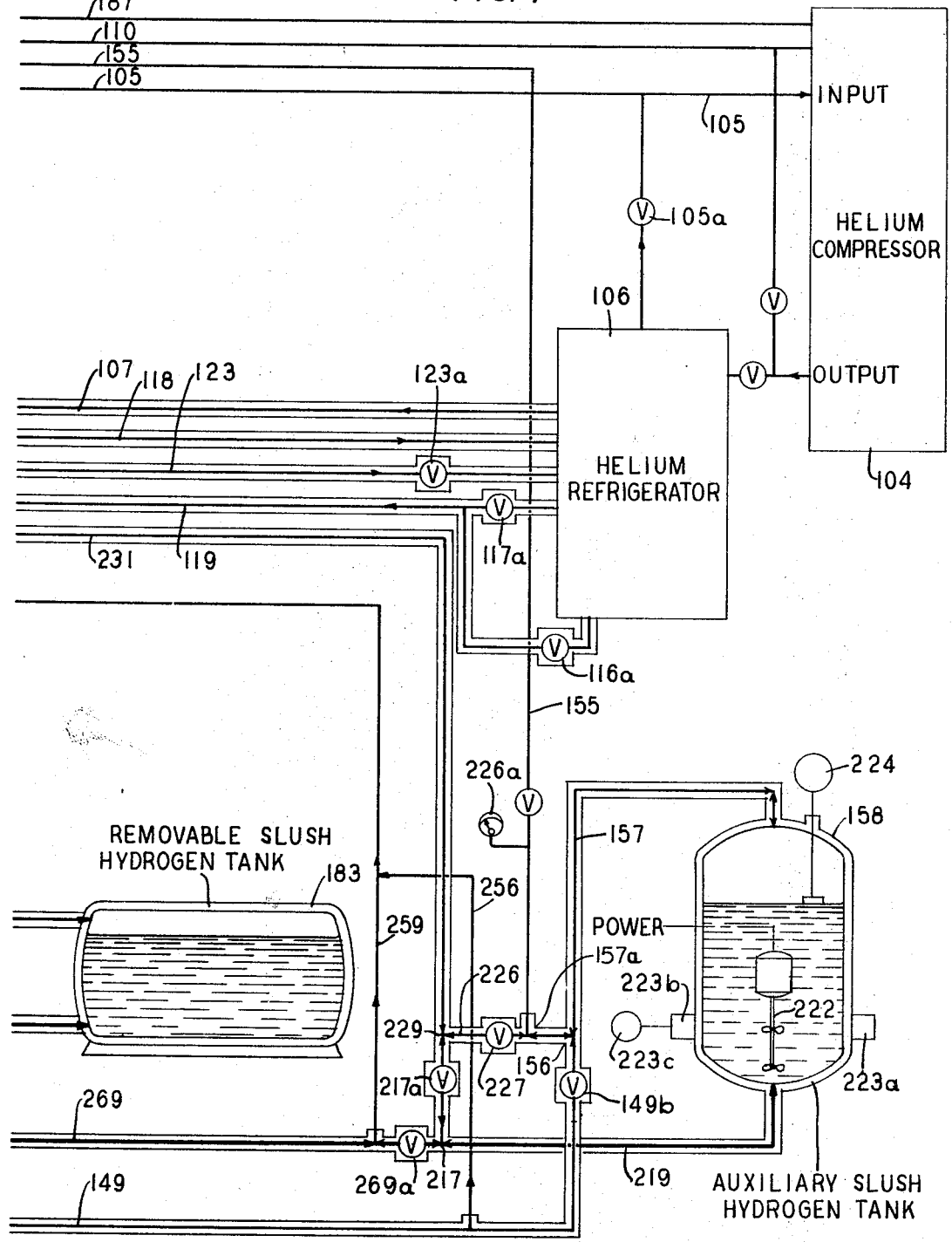

3,521,458
APPARATUS FOR MAKING HYDROGEN SLUSH USING HELIUM REFRIGERANT
Derk Th. A. Huibers, Berkeley Heights, Russell A. Hemstreet, Mountainside, and Howard K. Hover, Somerville, N.J., assignors to Air Reduction Company, Incorporated, New York, N.Y., a corporation of New York
Filed July 19, 1967, Ser. No. 654,455
Int. Cl. F25j 1/00
U.S. Cl. 62—45                    15 Claims

ABSTRACT OF THE DISCLOSURE

System including process and apparatus for treating hydrogen and other low temperature fluids to form slush. This system includes an improved slush generator wherein the supply of fluid is introduced into the inner chamber of a heat exchanger which is maintained by separate refrigeration means at a temperature below the melting point of the supply fluid. The frozen layer formed on the extended inner surface of the inner chamber is continuously shaved off in the form of powder by rotation of a composite mechanical blade and by the turbulent flow of the supply fluid. A semisolid slush is thus formed which is forced out of the device by the flushing action of the continuously supplied liquid, and the pumping action of the blade. Improvements in the generator include heat conducting baffles in the refrigeration chamber, providing the blade with an abrasive cutting edge and using a thin silicone coating to improve cutting action.

A hydrogen slush generator of the form indicated is included in a plant which comprises means for precooling and supplying the liquid hydrogen to the slush generator, separate refrigeration means, a gas pressurization and cooling system, and a product storage and handling section, including means for monitoring the product.

CROSS REFERENCE TO RELATED APPLICATIONS

R. A. Hemstreet application Ser. No. 654,419 filed at even date herewith.

BACKGROUND OF INVENTION

This invention relates in general to techniques, apparatus, and environmental systems for forming and processing slush from low temperature fluids; and more particularly, to the formation and processing of hydrogen slush.

Slush hydrogen, which is an intimate mixture of liquid and solid hydrogen, is of particular interest to the aerospace industry as a potential fuel or working fluid in rocket engines and in supersonic aircraft. The advantages of slush hydrogen over normal boiling liquid hydrogen for such purposes are the greater density and larger refrigeration capacity of the former, and reduced net positive suction head in pumping.

The traditional prior art method employed for preparing slush hydrogen has been by the vacuum method, in which liquid hydrogen is adiabatically evaporated at the triple point, producing a liquid-solid mixture.

The traditional prior art vacuum method has been found to have certain disadvantages, including the following:

(1) At the reduced operational pressures, the problem of air leak is present to an aggregated degree in large scale operations, increasing an ever present danger of explosion.

(2) By its nature, the prior art vacuum method is not well adaptable to continuous production.

(3) In prior art vacuum systems, the chunks of solid are of relatively large dimension and low density and must be broken up mechanically and aged up to three hours to provide particles which have satisfactory flow and packing characteristics.

(4) Part of the product is lost in producing the refrigeration needed for the vacuum process.

SUMMARY OF INVENTION

It is the object of the present invention to provide an improved method for forming, processing, storing and monitoring slush from low temperature fluids and more particularly hydrogen, wherein the foregoing disadvantages are largely elminated.

In accordance with the invention disclosed in the copending application of R.A. Hemstreet, filed at even date herewith, hydrogen, or another cryogenic supply fluid, is reduced to slush at ambient or higher pressure, which is maintained by supplementary gas pressurization. The needed refrigeration is indirectly supplied to the system by means of an auxiliary closed-cycle refrigerator. In the improved generator of the present invention, the refrigerant passes through a refrigeration chamber, in a heat exchanger, in which a plurality of heat conducting baffles are disposed. The flowing stream of refrigerant serves to cool a heat transfer surface facing an inner chamber to below the melting point of the supply fluid, causing the latter to solidify on the chamber's inner walls. The heat exchanger is super-insulated against heat in-leakage. A mechanical shaver which may be in screw form, rotates in the inner chamber of the heat exchanger, bearing against the solidified layer and continuously shaving off the solid in the form of powder, which is continuously expelled from the bottom of the vessel. A particular feature of the improved generator of the present invention is the induction of turbulent flow in the supply fluid as a supplement to the action of the mechanical shaver in loosening the slush particles from the frozen layer. Another feature is that the sharp cutting edge greatly reduces frictional contact at the surface of the frozen layer, thereby minimizing the heat dissipated in the generator.

In the disclosed system for forming hydrogen slush, refrigeration is supplied by liquid helium or cold gaseous helium forced thorugh the baffled outer chamber of the heat exchanger under slight pressure, and at an entering temperature below the triple point of hydrogen. A unique arrangement is employed in which the liquid hydrogen feed stream is precooled by passing it through a feed tank and a subcooler. The subcooler takes the form of a heat exchanger in which the hydrogen feed stream is cooled by a helium gas stream from the refrigerator to about 15° Kelvin. This arrangement has several advantages in that (1) it reduces the size of the slush generator; (2) it reduces the cost of refrigeration, since subcooling can be done with gaseous helium; and (3) it increases the available net positive suction head, thereby reducing the necessary elevation of the liquid hydrogen feed tank.

Another feature of the system comprises application of a pressurizing gas to the seal of the slush generator, and the alternative use of hot or cold helium (or hydrogen) gases for pressurizing the hydrogen slush storage facilities. This technique has the advantage of maintaining the seal of the slush generator and storage facilities at slightly above atmospheric pressure, thereby reducing the hazard created by air leaks into the system. Furthermore, the hot and cold pressurizing streams facilitate slush handling and storage by providing means to manipulate the environment.

An additional feature of the system comprises means for monitoring the quality of the product slush, both visually and by directing a beam of radiation through the container of slush to a detector either disposed in the path of or in a position to receive scattering from the radiant beam, the detector being connected to recording means calibrated in terms of density. This has the advantage that all measurements can be done externally without the use of sensors that must of necessity be built into the system and thereby disturb the flow pattern.

It is anticipated that in addition to hydrogen, the techniques and apparatus of the present invention can be successfully applied to any other low temperature fluids. Examples are oxygen, fluorine, and methane.

The following advantages over the prior art vacuum-type systems are realized by the techniques and apparatus of the present invention for manufacturing low temperature slush and particularly hydrogen slush:

(1) At ambient or higher pressures, at which the system of the present invention operates, there are no problems with air leaks, thus decreasing the danger of explosion. (Although the pressure of hydrogen at its freezing temperature is only 0.069 atmospheres, the slush producing process in accordance with the present invention is carried out at atmospheric pressures or higher in the absence of gas.)

(2) The system of the present invention has been found to be intrinsically ideal for continuous production of slush.

(3) The quality of the slush product is improved, in that the density of the solids and the percentage by weight of solids is substantially greater than in the case of slush produced with prior art vacuum methods.

(4) The loss of product in the system and process of the present invention is eliminated as contrasted to the prior art vacuum process, in which part of the hydrogen is consumed in producing refrigeration.

(5) Aging to make the product flowable is not required.

(6) The method of the present invention is readily adaptable to large scale production.

These and other objects, features, and advantages of the invention will be apparent to those skilled in the art from a study of the specification hereinafter with reference to the attached drawings.

BRIEF DESCRIPTION OF THE DRAWINGS

FIG. 1A is a showing of an improved embodiment of the slush generator of the present invention, adapted for large scale use, wherein laterally extended baffles are included in the refrigeration chamber.

FIG. 1B is a cross sectional showing of FIG. 1A;

FIG. 1C is a showing in longitudinal section of a modification of the embodiment of FIG. 1A, wherein longitudinally extended baffles are employed in the refrigeration chamber;

FIG. 1D is a cross sectional showing of FIG. 1C; and

FIGS. 2, 3, and 4 combined as FIG. 5 show in schematic a typical hydrogen slush pilot plant including a generator of the type indicated in FIGS. 1A, 1B, or 1C, 1D, together with a unique environmental system which includes liquid hydrogen supply means, refrigeration means or gas pressurization and cooling system, and a product storage and handling system.

FIG. 5 is a block diagram showing the manner in which FIGS. 2, 3, and 4 are to be combined.

Let us refer, now, to FIGS. 1A, 1B of the drawings which shown an embodiment of the invention particularly adapted for commercial application.

In the embodiment of FIGS. 1A, 1B, the slush generator is enclosed in an insulating jacket 30 which comprises, for example, an outer tubular stainless steel cylindrical shell 14 inches in outer diameter, one-eighth inch thick, and 69 inches in length, terminating at its lower end in a funnel configuration 30a. This tapers inwardly at an angle of 30 degrees, extending downwardly an axial length of eight and one-half inches, centering on an outlet pipe 65 enclosed in a coaxial insulating jacket 31. The latter has an outer diameter of four and one-half inches, the internal diameter of pipe 65 being one and one-half inches. Located concentrically within the stainless steel outer jacket 30 is an inner stainless steel tube 32 which is ten inches in outer diameter, one-eighth inch thick, and extends coaxially inside of the jacket 30 for a total length of 69 inches and about an inch beyond the top of the latter. Jacket 30 terminates at its lower end at a plane defining the top of funnel 30a in an inwardly projecting annular closure 32a, which has a central opening six inches in diameter. Tubes 30 and 32 are preferably formed of stainless steel or any of the metals well-known in the art to be useful for cryogenic applications.

In the present embodiment, the vacuum jacket formed by concentric tubes 30 and 32 has three laterally extended arms 33, 34, and 35, which concentrically surround conduits 43, 41, and 48, respectively, directed to the inner chambers of the generator, as will be described presently. Each of the aforesaid arms 33, 34, and 35 is four and one-half inches in outer diameter and two inches in inner diameter. The lower arm 34 is so disposed that the conduit 41 enters the generator just above the annular closure 32a. The upper arms 33 and 35 are located at the top end of the vacuum jacket so that the conduits 43 and 48 are connected to the inner chambers of the generator just below the lower end of the double-walled cylindrical plastic top 32b, 32c. The latter, which comprises a rigid plastic material suitable for cryogenic application, has an outer diameter of just under 14 inches, and an inner diameter just in excess of 10 inches, so that the total thickness from the outside of the outer wall to the inner face of the inner wall is just under two inches. Hollow plastic top 32b, 32c is precisely fitted onto and hermetically sealed into an annular sleeve formed by the outer tube 30 and the inner tube 32, providing with them a continuous closed vacuum chamber. The upper end of the double-walled plastic cylinder 32b, 32c extends 12½ inches above the arms 33 and 35, and is closed at the top with an inwardly extending hollow annular flange 32d which is one and one-quarter inches from top to bottom, and forms around the shaft 38 a centered opening 55 in excess of six inches in diameter into an open inner chamber, the opening 55 being sufficiently large for the removal of screw element 47 and the supporting bearing, which will be described presently.

The space between the outer insulated jacket 30 and the inner tube 32 and also, between the walls of the plastic cap 32b, 32c, is filled with laminated insulating material such as, for example, layers of aluminized polyethylene terephthalate about one-quarter inch thick. Before the operation of the apparatus commences, the space between outer jacket 30 and inner tube 32 is evacuated to a pressure which is preferably less than $10^{-4}$ millimeters of mercury, and then closed with a gas-tight seal. It will be understood that any other type of insulation suitable for cryogenic use may be substituted for the type of insulation described in the present illustration. It will also be understood that the vacuum insulated space just described may either be sealed off (known as "static" insulation) or may be continuously pumped (known as "dynamic" insulation). Moreover, it may, or may not, be connected to vacuum jackets of surrounding connecting conduits to form an integrated insulation system.

Located coaxially within vacuum jacket 30 and the inner tube 32 is another concentric tubular vessel 36 which is six inches in outer diameter, three-sixteenths of an inch thick, and 72 inches long, extending from a plane coincident with the top of funnel 30a to a plane one and one-half inches below a plane defining the upper periphery of arms 33 and 35. At the top of the tube 36 is welded or otherwise secured an outwardly extending annular flange 36c of L-shaped cross-section, which extends about two inches in a horizontal plane and two inches vertically to form an upwardly extending cylinder which is secured to the inner wall of the metal sleeve which surrounds the bottom of plastic cap 32b, 32c. The flange 36c serves to close the upper end of the refrigeration chamber formed between the tubes 32 and 36. At the bottom end, tubular vessel 36 is sealed externally with a fluid-tight seal to the annular closure 32a, forming an annular internal gas-tight jacket with tube 32.

The function of the tubular vessel 36, which in the present embodiment is formed of stainless steel but which may, for example, be formed in larger embodiments of copper, is to provide a container for the circulating refrigerant, and to provide an extended inner heat transfer surface of relatively high thermal conductivity. In the embodiment shown in FIGS. 1A, 1B of the drawings, which is particularly adapted to the use of gaseous refrigerant, surface 36 is extended by means of an outwardly projecting fin or baffle blade 36a wrapped in helical fashion around its outside surface with the successive windings spaced two inches apart in order to enhance its heat transfer characteristics, and to provide channeling means for the refrigerant adjacent surface 36. The helical fin 36a is one-eighth inch thick, or thinner, and projects one and three-quarters inches into the space between tubes 32 and 36. In addition to copper, other metals having sufficiently high thermal conductivity for this application include aluminum, brass, bronze, stainless steel, tantalum, titanium, and such alloys as, for example, Invar.

In the modification shown in FIGS. 1C, 1D the helical fins 36a shown in FIG. 1A are replaced by longitudinal fins 36b, which are preferred for the use of a liquid refrigerant. These may comprise longitudinal copper strips about one-sixteenth inch thick, extending the length of the screw and nearly the width of the evacuated space between tubes 32 and 36. They may be welded in end-on position, longitudinally, to the outer surface of tube 36 at positions about one-eighth inch apart, extending radially outward. This configuration channels the liquid and prevents the liquid from being driven to the outer surface 32, as might be the case with the helical fins 36a, which are preferred for gaseous refrigerant.

Substituting the structure 1C, 1D for 1A, 1B in the system indicated, the space between tubes 32 and 36 is filled with liquid helium from refrigerator 39, which may be of any of the types well-known in the art, such as, for example, one of the refrigeration systems disclosed in pages 57 to 73 of Cryogenic Engineering by Russell B. Scott, D. Van Nostrand Co., Inc., 1959 edition. The liquid helium flows from the refrigeration system 39 through conduit 41 under control of an extended bonnet type of cryogenic valve 41a, at a rate of 4.13 pounds per hour, entering the space between vessels 32 and 36 through lower arm 34 at a temperature of 4.7° Kelvin and an absolute pressure of 22 pounds per square inch. The function of the longitudinal fin 36b is to force the liquid helium to travel in a path in contact with an extended heat transfer surface, thus increasing the heat transfer from the outer surface of the tube 36. At the temperature of boiling helium, assuming the wall of chamber 36 is of stainless steel three-sixteenths of an inch thick, the heat transfer from the inner chamber should be of the order of 127 British thermal units per hour, per square foot, per degree Fahrenheit. In a heat transfer through the walls of the tube 36 and longitudinal fins 36b, the liquid helium absorbs sufficient heat to convert it to gas, which leaves through the upper arm 33 by way of conduit 43, returning to the refrigeration system 39. Conventional cryogenic resistance thermometers 44 and 45 measure the temperatures of the refrigerant helium entering through conduit 42 and exiting through conduit 43.

The flanged upper end 36c of the tubular vessel 36 serves to support the bearing and seal assembly 46a, 46b, which may assume any of the forms well-known in the art for such cryogenic applications. A suitable bearing 46a for the purposes of the present application is the pillow block bearing shown in the drawing on page 10–56 of Dodge Engineering Catalogue D–66, First edition, published by the Dodge Manufacturing Corporation on Jan. 3, 1966. An alternative bearing for this purpose is that described in an article entitled "Thrust Ball Bearing" by H. L. Knotts, Machine Design, volume 38, No. 6, March 10, 1966, pages 55 and 56. A suitable seal 46b to be installed above a bearing of the foregoing description which will function to provide a gas-tight chamber inside of the tube 36 is that disclosed in FIG. 6–74, entitled Double Mechanical Seal, and described on page 6–34 of Perry's Chemical Engineers' Handbook, Fourth edition, McGraw-Hill Book Company, 1963. This may include one or more O-rings formed of an elastomer suitable for cryogenic applications, such as manufactured by the Minnesota Mining and Manufacturing Co. under the trade name "Kel-F," or alternatively, fiberglass reinforced polytetrafluorethylene.

The shaft 38 is mounted for rotation in the axial bore of the thrust bearing 46. The bronze shaft 38, which is just under an inch in diameter to permit it to fit snugly in the bore of the thrust bearing 46a, is integrally connected at the lower end of the bearing to the body 47 of the screw-form mechanical cutter, which in the present example is also bronze, five inches in body diameter and 72 inches long in its cylindrical portion, tapered at its bottom end through a 30 degree angle to a centrally disposed point five inches below the bottom of the cylindrical portion. Although a bottom bearing could be used, the rotatable cutting device 47, as presently disclosed, is without a lower bearing and is self-centering through the action of the thrust bearing 46a.

Around the cylindrical body element 47 is wrapped a helical cutting edge 47a. In the present embodiment, the screw portion is about 76 inches long. The blade 47a may be formed of, for example, any material suitable at cryogenic temperatures to provide a wear resistant cutting edge a few mils thick, and having a clearance of about five mils from the inner surface of tube 36. For this purpose, the blade 47a may be formed of, or tipped with, for example, one of the hard cobalt-based, wear resistant alloys, such as manufactured by the Haynes Stellite Company, Kokomo, Ind. (a division of Union Carbide Corporation), under the name "Haynes Stellite," [1] Nos. 3, 6, 93, and 6K. (The compositions of the first three alloys are indicated on page 13 of Brochure F–30,076E, June 1962, and the composition of alloy 6K is indicated on page 8 of Brochure F–30,158B, September 1961. Both brochures are publications of the above-named company.) The blade 47a takes the form of a two-inch wide strip, three-sixteenths of an inch thick, which is wrapped around the shaft 38 in edge-on fashion and welded or braised thereto so that it projects laterally approximately two inches from the curved surface of shaft 47.

The total length of the screw portion is 72 inches, the helically wound blade 47a executing 38 turns on shaft of 47, starting just below the solid bearing 46a and terminating at the tip of point 47b, which is centered in the funnel-shaped internal space below the bottom of heat transfer surface 36, leading into the egress pipe 65. In the present example, successive turns of the helically disposed blade 47a are about two inches apart, measured from center to center along the axis. The design of the screw-shaped cutting element 47 is substantially similar to that described with reference to FIGS. 3A and 3B of the copending application of R. A. Hemstreet, filed at even date herewith.

The cutting edge of the blade 47a, instead of being parallel to the inner heat transfer surface of tube 36, is cut back to form an angle of about five degrees therewith, in a direction away from the direction of flow, so that ---
[1] Registered trademark, Union Carbide Corporation.

particles of solid hydrogen, frozen on the inner surface of 36 in a manner to be presently described, are constantly being shaved off. The edge of blade 47a closest to the heat transfer surface 36 is sharply honed and is separated about five mils from the inner wall surface. In addition to being sharply honed, it may be coated with silicone a few mils thick, to decrease the frictional wear.

Above the thrust bearing 46a the shaft 38 passes out of the body of the generator through a mechanical shaft seal 46b, of the type previously described. Shaft 38, after passing through mechanical coupling means 24, is connected through an appropriate arrangement of gears to a variable speed motor 56. In the present embodiment the motor 56 is one-eighth horsepower and designed to be operated with 110 volt alternating current and to draw a current of approximately 0.83 amperes when operating at a speed of 50 revolutions per minute. It is designed to operate within the range 12 to 120 revolutions per minute. Disposed on the shaft 38 of the motor 56, above the top of the thrust bearing 46a is a meter 57a for measuring the torque of the motor during the hydrogen slush operation. This may take the form of a dynamometer, well-known in the art. In addition a tachometer 57b is attached to the shaft to measure the revolutions per minute of the shaft 38.

Gaseous helium from the refrigeration plant 39 passes through valve 59 through an auxiliary conduit 43a into the insulation compartment through the plastic cover 32d for pressure balancing the seal 46b surrounding the shaft 38. In the present example, gaseous helium for seal-balancing is applied at an absolute pressure of 22 pounds per square inch.

Liquid hydrogen for the operation of the slush generator is supplied from a sufficiently elevated 250 gallon double-walled Dewar storage tank 61, of any of the types well-known in the art, such as the general type disclosed, for example, in Figure 7.7 on page 226 of Cryogenic Engineering by Russell B. Scott, D. Van Nostrand Co., Inc., 1959.

The liquid hydrogen passes from tank 61 through pump 62. In the present application the latter, which may be of any of the types suitable for cryogenic applications, has a capacity of 2.5 gallons per minute. It is operated by a one-eighth horsepower motor under a differential head of 25 pounds per square inch with a 60 percent efficiency. From pump 62 the stream of hydrogen flows through junction 63 and into conduit 48 under control of the normally open cryogenic valve 64a. return conduit leads from junction 63 back to the storage Dewar 61 under control of valve 64b which is normally closed.

The stream of hydrogen passing through conduit 48, surrounded by the arm 35 of the vacuum jacket 30, is maintained at an absolute pressure of 40 pounds per square inch. For the present application the temperature is 15° Kelvin. The flow rate, which is measured by means of the conventional cryogenic flowmeter 60, is preferably within the range one to five gallons per minute, the rate controlling the quality of the output product, as will be explained.

The stream of liquid hydrogen from conduit 48 flows into the space between the rotating screw 47 and the heat transfer surface of vessel 36, which has been cooled by heat exchange with the helium refrigerant to a temperature below the hydrogen melting point, about 13.8° Kelvin. The liquid hydrogen freezes out on the inner surface of vessel 36, forming a frozen layer about 0.0625 inch thick. As the screw body 47 is rotated, particles from the frozen layer on the inner surface of stainless steel tube 36 are shaved off, being forced by the pressure of the pump through the conduit 65 located in the outlet 31 at the base of the generator.

The slush hydrogen so produced flows through a system of insulated conduits to the Dewar-type storage facility 69 through junction 76 and conduit 66 under control of normally open valves 67 and 86, which may be of any of the types suitable for controlling a semisolid flow at cryogenic temperatures. The 1500 gallon slush hydrogen storage facility 69 is a double-walled Dewar container, substantially of the form indicated with reference to the liquid hydrogen storage facility 61. In the present illustration, the storage facility 69 is designed to have a heat-leak of less than 2% per day.

A conduit 72, cross-connected to the gaseous helium exit conduit 43, is designed to deliver gaseous helium under control of valves 73 and 70 to the upper portion of tank 69 to maintain the stored hydrogen slush in the present embodiment under a pressure of 22 pounds per square inch absolute. This is controlled by a pressure regulator 71, which is of a conventional form suitable to cryogenic storage facilities. A conduit 74 is connected to the hydrogen slush conduit 66 under control of normally closed valve 75 to permit hydrogen slush to pass into the upper part of the storage facility 69.

Another alternative is provided by a conduit 78 connected between the junction 76 and the liquid hydrogen storage facility 61, whereby a portion of hydrogen slush and liquid hydrogen can be returned for regeneration under control of the valve 77.

In accordance with a particular feature of the invention, the screw-shaped cutting device 47 is constructed, in combination with other parameters of the system, to provide turbulent flow of the liquid hydrogen in contact with the frozen layer deposited on the inner heat exchange surface of the vessel 36, by providing a path of reduced cross-section for the downward flow of liquid hydrogen during the slush making process. This produces turbulent flow along the spiral path between the screw blade and the interior heat transfer surface of vessel 36.

For optimum operation of the present embodiment, the flow of liquid hydrogen along the spiral path adjacent the tubular vessel 36 should be such that the Reynolds number is within the range 2000 to 10,000, where the Reynolds number $N_R$ is defined as follows:

$$N_R = \frac{DV}{\mu} \rho \quad (1)$$

where:

D = the cross sectional dimension of the path of flow in a given plane normal to the direction of flow;
V = velocity of flow of the liquid hydrogen stream;
$\rho$ = density of the liquid hydrogen stream; and
$\mu$ = viscosity of the liquid hydrogen stream.

It will be apparent from the foregoing that since the Reynolds number is a function of D, the path of flow, this may be controlled by the design of the screw. For example, it has been found that when the screw is designed so that the spiral path of flow of the liquid hydrogen between screw turns has a susbtantially square cross-section two inches wide and two inches deep, as in the embodiment of FIGS. 1A, 1B, or 1C, 1D, the Reynolds number is 10,000. When the screw is designed so that the annulus between turns is 10 inches wide and 10 inches deep, the Reynolds number is reduced to 2000. The turbulent flow of the passing liquid functions to flush off particles clinging to the solid hydrogen film.

The following considerations are fundamental to the quality of the hydrogen slush obtained by the process of the present invention:

(a) The cross sectional size of the particles obtained by the method of the present invention has been found to vary inversely with the speed of rotation of the cutting screw, which in the embodiment just described is between 12 and 120 revolutions per minute.

(b) Assuming that the amount of refrigeration supplied by the liquid helium system remains constant, the percentage of solids in the slush hydrogen product varies inversely as the amount of liquid hydrogen supplied at the optimum temperature of 15° Kelvin.

(c) Assuming the liquid hydrogen supply to be constant, the percentage of solids in the slush hydrogen product varies directly with increased helium refrigeration.

In a particular example of operation in accordance with the present invention, using the slush generator system disclosed in FIGS. 1C, 1D the following parameters are employed:

TABLE I
[Rate of rotation of screw = 50 revolutions per minute]

| Liquid Helium Refrigerant | |
|---|---|
| Into the generator: | |
| (a) Rate of flow | 200 gallons per hour. |
| (b) Entrance temperature. | 4.7° Kelvin. |
| (c) Entrance pressure | 22.5 pounds per square inch absolute. |
| (d) Exit temperature | 4.7° Kelvin. |
| (e) Exit pressure | 21 to 22 pounds per square inch aboslute. |

| Liquid Hydrogen | |
|---|---|
| Into the generator: | |
| (a) Rate of flow | 2.25 gallons per minute. |
| (b) Entrance temperature. | 15° Kelvin. |
| (c) Entrance pressure | 25 pounds per square inch absolute. |
| (d) Density | 4.7 pounds per cubic ft. |

| Slush Product | |
|---|---|
| Out of the generator: | |
| (a) Amount | 2.08 gallons per minute. |
| (b) Percent solids | 50. |
| (c) Density | 5.1 pounds per cubic ft. |
| (d) Exit pressure | 22 pounds per square inch absolute. |

Referring to FIGS. 2, 3, 4 of the drawings, which are combined in the manner shown in FIG. 5, there is shown in schematic, the flow diagram for a slush hydrogen plant designed for use in combination with a slush hydrogen generator of the type disclosed in FIGS. 1A, 1B, or alternatively, 1C, 1D of the drawings, which is designed to produce 3000 gallons (2050 pounds) per day of slush hydrogen.

In addition to the slush hydrogen generator of one of the types disclosed in FIGS. 1A through 1D, the plant indicated in FIGS. 2, 3 and 4 includes a helium refrigeration plant, a product storage and handling section, and a cooling system for pressurization with cold helium.

Helium gas for refrigeration passes from a conventional helium storage means 101, which may comprise, for example, helium gas trailers, of a type well-known in the art, through a conventional pipe system past junction 96 to the T junction 102, through normally open valve 105b of the conduit 105, which leads through the compressors 104 to the helium refrigeration system indicated by block 106.

Compressor system 104, which is connected to the high pressure end of refrigeration system 106, comprise non-lubricated compressors of any of the suitable types known in the art, which serve in the present illustrative example to compress helium at a flow rate of 128.7 gallons per second, at one atmosphere pressure absolute and a tempertaure of 306° Kelvin, to a pressure of 11 atmospheres. Helium refrigeration system 106 may comprise any of the types well-known in the art, such as disclosed, for example, in Fig. 2.30 on page 64 of Cryogenic Engineering by Russell B. Scott, D. Van Nostrand Co., Inc., 1959. In refrigeration system 106, the compressed feed stream is cooled by several stages of heat exchange with the cold returning low pressure streams (and through a work expansion step not separately shown), to a temperature of 12.4 degrees Kelvin at a flow rate of 92.2 gallons per second. At this temperature point, a portion (12.9 gallons per second) is passed out through a conduit 107 connected through junction 108 under control of appropriate cryogenic valves 111a and 112a, to a system including pressurizing gas cooler 113 and liquid hydrogen subcooler 114, to be described hereinafter.

The remainder of the flow in the refrigerator 106 passes at 79.39 gallons per second through an additional heat exchanger stage in which it is cooled to 6.1° Kelvin at about 10 atmospheres pressure. It is then expanded in a Joule-Thomson valve to a pressure of 1.5 atmospheres, reaching a temperature of about 4.7° Kelvin, at which 51.4 percent liquefies. The residue flash gas returns as low pressure gas, in a reverse direction through the stages of heat exchange in the refrigerator 106, where it is joined by gas returning from the pressurizing gas cooler 113 and the liquid hydrogen subcooler 114 through conduit 118 from junction 115 at a temperature of 20° Kelvin, as will be explained. The returning low pressure stream, after it has cooled the high pressure streams incoming to the refrigerator 106, is passed through conduit 105a into the compressor unit 104 for recompression and recycling through the refrigeration system 106.

It will be understood that the refrigerator 106 is adapted to supply either liquid helium through valve 116a from the bottom of a tank containing a Joule-Thomson valve, or alternatively, to supply cold gaseous helium through valve 117a from the cold end of the heat exchanger system at a point above the Joule-Thomson valve, depending on the form of the slush generator 100.

In the former case, liquid helium from the refrigerator 106, flowing at the rate of 40.76 gallons per second, at a temperature of 4.7° Kelvin and a pressure of about 1.5 atmospheres, passes under control of cryogenic valve 116a into the conduit 119, through junction 121 into the helium intake conduit 41 (FIG. 1C) of the slush generator 100. Assuming the structure of FIG. 1C, the liquid helium refrigerant passes through intake conduit 41 and in contact with the longitudinal fins 36b of the cylindrical vessel 36, cooling its inner chamber and freezing hydrogen on the inner surface of vessel 36. The liquid helium, which has evaporated in the course of its traverse through generator 100, passes from the outgoing conduit 42 of FIG. 1C, corresponding to conduit 123 of FIGS. 2, 3 and 4. As shown in FIGS. 2, 3 and 4, the returning gas stream flows under control of cryogenic valve 123a, joining the low pressure flash-gas stream for return through the heat exchangers of the helium refrigerator 106 for recompression and recycling.

Assuming the use of helium gas refrigerant, as in the alternative case, this passes under control of valve 117a, at about 10 atmospheres pressures, at a temperature of 6.1° Kelvin, and flowing at the rate of about 80 gallons per second. Assuming generator 100 takes the form of FIGS. 1A, 1B, the cold gaseous helium flows in through the conduit 41, making contact with the helical fin 36a in contact with the vessel 36, thereby cooling the inner surface of the latter. As in the previous illustration, the stream of refrigerant passes out through conduit 43, returning to the refrigeration plant, as shown in FIG. 1A, for recompression and recycling. A shunt conduit 125 (FIG. 3), which operates under control valve 126, permits connection between conduits 119 and 123 for start-ups control, and testing purposes of the helium refrigerator.

It will be understood that whereas a liquid helium refrigerator system has the advantage of producing a lower temperature, and therefore would provide a more compact generator, gaseous helium on the other hand, provides less costly refrigeration.

The liquid helium tank in the refrigeration plant 106 will be made large enough so that a reserve of liquid helium can be built up and used to run the slush generator 100 at greater than design capacity for limited periods, thus testing it capacity.

Referring now to the feed system, liquid hydrogen supply fluid is supplied to the generator 100 from a liquid hydrogen refrigeration plant 128 which may assume any of the forms well-known in the art, adapted to supply either liquid or gaseous refrigerant in the desired temperature range, such as, for example, the type shown in Fig. 2.30, page 64 of Cryogenic Engineering by Russell B. Scott, D. Van Nostrand Co., Inc., 1959.

Liquid hydrogen from storage plant 128 passes through the conduit 129 under control of the cryogenic level-indicator controlled valve 129c, flowing into feed tank 134. When liquid hydrogen is supplied at a relatively high pressure some may be flashed off from tank 134 through valve 198a in order to save helium refrigeration. More hydrogen may be flashed off if the pressurization gas precooler 140 is used in order to prevent a temporary surge in the helium refrigerator.

Liquid hydrogen flows from the bottom of the feed tank 134 through the valve 162a to the junction 161, and then through the subcooler 114, which preferably takes the form of a shell and tube type of heat exchanger, designed to minimize plugging. The liquid hydrogen stream, after passing through the subcooler 114, is cooled down to a temperature of 14.5° Kelvin, as measured in the temperature indicator 163a.

It then flows through the conduit 165 into the pump 166 (which may take the form of a vacuum insulated centrifugal type suitable for pumping cryogenic fluids), through junction 209 into conduit 169. A return path is provided to the inlet to subcooler 114 through normally closed valves 208b and 208a. In addition, a shunt path is provided around subcooler 114 between the tank 134 and juunction 163 at the subcooler outlet through valve 215a.

The liquid hydrogen flow rate in 169 is regulated and the flow rate, temperature, and pressure are measured by appropriate cryogenic means 169b, c, and d. In the present example, the flow rate is 2.25 gallons per minute, the temperature is 15° Kelvin, and the pressure 25 pounds per square inch absolute at the point of ingress to the generator 100. The liquid hydrogen stream flows from conduit 169 through junction 168 through valve 169a and into the slush hydrogen generator 100, which is of the form shown in detail in FIGS. 1A, 1B or 1C, 1D. Referring to these figures, the liquid hydrogen stream enters through conduit 48, where it is introduced into the interior of the vessel 36, forming a solid hydrogen coating on the inner surface thereof, in a manner described in detail hereinbefore.

The hydrogen slush formed by rotation of the shaver 47 against the inner surface of vessel 36 passes out through conduit 65 (which corresponds to conduit 172 of FIG. 3). At this point, the temperature and pressure are respectively measured by appropriate cryogenic meters 172a and 172b. In the present example, selected values for these parameters are 13.8° Kelvin and 22 pounds per square inch absolute, respectively.

The quality of the generated slush is continuously monitored by an electronic assemblage 173, which comprises a high energy radiation emitter 173a of, for example, gamma rays or fast neutrons, disposed adjacent the wall of conduit 172 on one side, and a radiation detector 173b disposed at a diametrically opposite position adjacent the other side of the conduit wall, in the path of the radiation beam. Alternatively, instead of being positioned to detect the attenuated direct beam passing through the conduit 172, the detector 173b may be disposed to respond to radiation scattering produced by the beam as it passes through the conduit. The detector 173b is connected to a recording device 173c which is calibrated to read the current generated in the detector 173b in terms of the density of the monitored slush. The assemblage 173 may be, for example, an apparatus of the type described in detail in Paper 19A by J. A. McConnell and W. W. Snuk, Sun Oil Company, Philadelphia, Pa., at the 61st National Meeting of the American Institute of Chemical Engineers, Feb. 21, 1967, Houston, Tex. The current generated in the detector is an exponential function of the density of the hydrogen slush:

$$I = I_0 e^{-(\sigma p x + c)}$$

where:

I = detected radiation intensity
$I_0$ = emitted radiation intensity
c = insulating constant
p = density of hydrogen slush
x = distance through hydrogen slush stream
$\sigma$ = characteristic factor for hydrogen slush.

Attached to line 172, and continous therewith for providing visibility of the product, is a transparent line 174. This may comprise any transparent material constructed to withstand liquid helium temperatures, such as a product known by the trade name "Helium Sight Glass," manufacture by Johns' Technology, Inc., Livermore, Calif.

The transparent line 174 is connected to four-way junction 176. via valve 174a. The slush path passes by way of valve 174b, through the T junction 178, and a flexible coupling line between valves 174c and 174d, to the intake of the removable slush storage tank 183. The latter may be, for example, a 1500 gallon double-walled highly insulated Dewar-type tank.

An alternative slush path passes from T junction 178 via valve 179a to junction 170, and into conduit 269. The stream passes via valve 269a, through T junction 217 and conduit 219 to the slush intake of an auxiliary slush-hydrogen tank 158. The tank 158, substantially similar in form to tank 183, is a 1500 gallon double-walled Dewar-type tank. Tank 158 includes mixer 222, driven by a submersible motor suitable for cryogenic application. Tank 158 is also equipped with a movable float type of liquid level indicator 224 of any of the types adapted for cryogenic application. On diametrically opposite sides of the tank 158 are disposed means 223 for monitoring the slush quality, comprising a radiation source 223a and a radiation detector 223b, such as described with reference to the radiation assemblage 173. As previously described, detector 223b may alternatively be disposed to detect scattering instead of the attenuated direct beam. Radiation detector 223b is connected to a recorder 223c, calibrated in terms of slush density, as previously described with reference to 173.

Each of tanks 183 and 158 is maintained at a pressure of, for example, 20 pounds per square inch absolute, by means of a pressurizing stream of helium. For this purpose, helium derived from the source 101 passes through conduit 95 and junction 96 to junction 102, and via valve 103a to junction 138. From the latter, the pressurizing gas passes through conduit 139 to junction 141 where, via valve 142b, it passes into the pressurizing gas precooler 140 in the bottom of feed tank 134. This precooler may take the form of a small, compact heat exchanger chamber which is immersed in the liquid hydrogen bath of feed tank 134.

From the outlet of the pressurizing gas precooler chamber 140, the stream passes through the insulated conduit 143 to the pressurizing gas cooler 113. The latter takes the form of a shell and tube type of vacuum-insulated heat exchanger, which is specially designed to be relatively free from plugging. The helium pressurizing gas stream, which is further cooled by a heat exchange with cold gaseous helium in pressurizing gas cooler 113, passes out through insulated conduit 144 via valve 144a to junction 146, where it may be combined with a stream of warmer pressurizing gas which has bypassed the pressurizing gas precooler 140 and the pressurizing gas cooler 113, passing directly from the junction 141 through the uninsulated conduit 147 via valve 147a. The temperature of the pressurizing gas is measured by the temperature indicating device 149a. The stream passes through the insulated conduit 149, to junction 151. Assuming valve 151a to be closed, the pressurizing stream may pass through junction 154, conduit 153, junction 186, and through conduit 188 to storage tank 183, at 20 pounds per square inch absolute. In addition (or alternatively), the path of the pressurizing stream may extend via valve 149b to junction 156. This path continues through branch 157 into the top of the auxiliary hydrogen slush storage facility 158 where it maintains a pressure in the latter of 20 pounds per square inch absolute.

The system is designed so that under certain circumstances hydrogen, instead of helium, may be used for temporary pressurization of the tanks. It will be noted that the use of hydrogen (or warm helium) for this purpose is only a temporary expedient which depends for its effectiveness on the stratification in the slush hydrogen storage tanks. If hydrogen (instead of helium) pressurization is desired for tanks 183 and 158, hydrogen gas is derived from the high pressure hydrogen source 136, through conduit 137, at a pressure of 20 pounds per square inch absolute, via valves 137a and 137c to junction 138. From the latter, the stream flows through junction 141 and uninsulated line 147 to junction 146. The paths from junction 146 for the pressurizing streams of hydrogen to the tanks 183 and 158 are the same as those described for the helium pressurizing streams.

In addition to the above-described pressurization of the storage tanks, the seal at the top of generator 100 is pressured to, say, 30 pounds per square inch absolute. This is carried out with helium passing from the source 101 through junctions 102 and 254 and conduit 255, by way of valve 255a.

An auxiliary feature of the system is the presence of the three kilowatt heater 203 and a connected circuit which provides a stream of warm helium gas for deriming the helium refrigerator 106, and other parts of the system. Helium is supplied to the heater 203 from source 101 over conduit 95, through junction 96, via valves 110c and 110a. After the gas has been heated up in heater 203 under control of the temperature control device 203a to the desired temperature, it passes out through junction 204, and either through conduit 187 to the compressor 104 and refrigerator 106, or alternatively, through conduit 205 via valve 205a to junction 141, from which junction streams of heated gas may be passed into other parts of the system for deriming.

A number of cross-connections are provided between the two storage facilities, between the ingoing and outgoing circuits, and between the pressurizing and slush circuits, to provide maneuverability of the various operations.

A cross-connection is provided between junctions 156 and 229 via valve 227; and between T connections 229 and 217 via valve 217a.

The junction 229 is connected for flow in either direction, as desired, through the conduit 231 to the junction 191. The latter is in turn connected via valve 193a through the conduit 193, for return flow of liquid hydrogen through the junction 194 to the hydrogen storage plant facility 128 for recycling. In addition, junction 191 is connected to junction 176 through junction 189.

Additional cross-connections are provided between conduits 188, 174, 269, and 149. These include, for example, the connection between T junctions 178 and 170 via valve 179a, between junctions 170 and 151 via valve 151a, and between junctions 189 and 186 via valve 188a.

Moreover, one arm of junction 176 in the principal slush conduit 174 is connected through the line 235 to junction 168 to the intake line 169 to the slush generator, for by-passing the hydrogen slush generator during cool down operations.

Furthermore, connections to the hydrogen flare stack 253 are provided from junction 157a at the top of tank 158 through line 155, and from line 188 at the top of tank 183 through line 184, which joins line 155. The latter passes through junctions 200 and 196 to the flare stack 253. Also, line 149 is connected through line 256; line 269, through line 259; and line 174, through line 260. Each of the latter are single, uninsulated lines joining line 257, which passes through junction 258 and line 193 to junctions 197 and 196, also leading to the hydrogen flare stack. It will be apparent to those skilled in the art that there will be additional emergency outlets and safety valves of a conventional nature, not all of which have been shown.

In FIGS. 2, 3, 4 of the drawings, highly insulated cryogenic lines are shown with double lines, whereas ordinary lines are indicated with a single line. Pressure, temperature, and flow recorders are indicated at various points in the circuit. These are all of a conventional design, constructed for cryogenic application, at liquid helium temperatures.

Thus the product slush after being generated in the slush generator 100 can be stored in one of the two 1500 gallon storage tanks 183 or 158. From there it can be transferred by pumping, or by warm or cold helium or hydrogen gas pressurization, to the other tank. Alternatively it can be pumped through a path which includes conduit 232, 214 and 165, through pump 166 to junction 209, and again through conduit 169 and the slush generator 100 for upgrading its solids content. The two alternative tanks are provided. In addition, the product slush can also be transferred directly to a trailer (not shown) instead of the removable slush hydrogen tank.

A particular feature of the apparatus described is that the visual appearance of the slush as it leaves the slush generator can be observed through a special sight glass conduit 174 which can be installed from the slush generator to the receivers. As indicated the solids content of the slush can be measured and evaluated by gamma (or alternative types) radiation absorption. This system has the advantage that probing can be done externally. No sensors that may disturb the flow pattern need to be built into the apparatus. In this way the slush leaving the generator can be monitored continuously. Moreover, it is possible to thereby measure variations in slush density by scanning the storage tanks. Thus one is able to investigate whether the solids settle at the bottom of the storage tank and whether some solids will be left after pressure transfer of the contents of the tank. It is accordingly apparent that the slush handling characteristics of the system can be studied by each of the following means:

(1) Visual inspection through a sight glass.
(2) Measuring pressure drop in the lines.
(3) Pressure transfer from one receiver to another.
(4) Pumping with a centrifugal pump.
(5) Pressure transfer from a receiver into a tank trailer.

In the example described with reference to FIG. 5, the refrigeration requirements for the production of 3,000 gallons per day (2050 pounds per day) of 50 percent slush hydrogen, ready for delivery, using a slush generator of the form of FIGS. 1C, 1D, which is cooled with liquid helium (although cold gaseous helium can be substituted for this purpose, using the form of FIGS. 1A, 1B) are estimated as follows:

| | British thermal units/hour |
|---|---|
| (1) For liquid hydrogen subcooling from 15.0° to 13.8° Kelvin at 25 pounds per square inch gauge | 290 |
| (2) For solid hydrogen formation | 1,071 |
| (3) For generator screw work | 188 |
| (4) For liquid and slush hydrogen | 243 |
| (5) For heat leak into the two product receivers | 284 |
| (6) Additional heat leaks | 354 |
| Total | [1] 2,430 |

[1] Equals 710 Watts.

Pump 166 can pump 6.50 gallons per minute;
2.25 gallons per minute of liquid hydrogen for making 85.5 pounds per hour of 50% slush;
1.68 gallons per minute of slush hydrogen for upgrading its solids content; and
2.57 gallons per minute of excess liquid hydrogen to vary generator capacity.

The amount of work for pump 166 is only the work of pumping 2.25 gallons per minute of liquid hydrogen and 1.68 gallons per minute of slush hydrogen, since the pumping rate can be adjusted with a variable speed drive.

The slush generator 100 is given enough capacity to make new slush and upgrade slush from storage simultaneously.

Liquid hydrogen feed is precooled to about 15° Kelvin in heat exchanger 114 with refrigerator helium gas at 12.4° Kelvin. The refrigeration load of both precoolers is as follows:

For precooler 114:
 (1) For subcooling liquid hydrogen from 20.27° to 15.0° Kelvin—1600 British thermal units per hour.
 (2) For heat leak upstream of the generator, etc. 200 British thermal units per hour.
Total for precooler 114: 1,800 British thermal units per hour=527.2 watts
For precooler 113:
 (3) For cooling helium pressurizing gas from 21.1 to 13.8° Kelvin—300 British thermal units per hour=87.85 watts.

Provision is made in the disclosed system for cooling helium pressurization gas from 21.1 to 13.8° Kelvin in the parallel after-cooler 113. This gas has been cooled first from ambient temperature to 21.1° Kelvin in pressurizing gas precooler (heat exchanger) 140, installed for this purpose in the hydrogen flash tank 134. Pressurizing gas precooler (heat exchanger) 140 has a rating of 11,850 British thermal units per hour (3460 watts). This means a hydrogen flash rate of 61.7 pounds per hour. Flashing is optional, but provides for a big saving in the helium refrigerator cost.

For subcooling liquid hydrogen from 23.8° Kelvin (boiling point at 20 pounds per square inch gauge) to 20.3° Kelvin (boiling point at 0 pounds per square inch gauge) another 7.3 pounds per hour is flashed off, saving another 1410 British thermal units per hour (412 watts) in helium refrigeration capacity.

It will be apparent to those skilled in the art that practice of the present invention is not limited to any specific form of apparatus or system disclosed herein by way of illustration or to the specific materials or refrigerants which they employ by way of example. Moreover, it will be aparent to those skilled in the art that in addition to the formation of slush hydrogen, the principles of the present invention can be applied to the formation of slush from other cryogenic fluids, such as, for example, fluorine, methane, and oxygen.

The scope of the invention is defined by the appended claims.

What is claimed is:
1. A cryogenic system for forming slush hydrogen as an end product from liquid hydrogen comprising in combination, a source of supply of liquid hydrogen for slush conversion, a source of refrigerant fluid helium, a slush generator comprising an insulating jacket for maintaining a low temperature environment within said jacket, a tubular vessel comprising a material of relatively high thermal conductivity disposed longitudinally within said jacket, said vessel comprising an extended inner heat transfer surface, an annular compartment formed between said insulating jacket and the outer surface of said tubular vessel, means for maintaining said inner heat transfer surface at a temperature below the melting point of said hydrogen comprising a system of baffles of relatively high thermal conductivity disposed within said annular compartment and connected to the outer surface of said tubular vessel to form channeling means adjacent the outer surface of said tubular vessel for channeling refrigerant in contact with said surface, said annular compartment connected through fluid-tight means to said source of refrigerant fluid, means for connecting said source of liquid hydrogen to the interior of one end of said tubular vessel to maintain a stream of said liquid hydrogen in contact with said heat transfer surface to form a frozen layer thereon, shaving means for continuously shaving particles from said frozen layer rotatably disposed within said tubular vessel and being normally submerged in said liquid hydrogen, said shaving means comprising a longitudinally disposed shaft and blade means constructed and arranged to periodically contact successive portions of said frozen layer during rotation of shaid shaft, a source of power connected to said shaft for driving said shaving means to rotate, said connecting means including pump means for forcing said stream of liquid hydrogen through said vessel to assist in discharging the slush hydrogen from the tubular vessel, said pumping means and the configuration of said shaving means in said tubular vessel causing turbulent flow of the liquid hydrogen which serves to flush off particles clinging to the frozen layer, and means communicating with one end of said tubular vessel for collecting and storing the slush formed from said particles.

2. The combination in accordance with claim 1 in which said shaving means for periodically shaving particles from said frozen layer is in the form of a screw having a laterally extended blade wrapped helically around said shaft.

3. The combination in accordance with claim 2 in which the shaft of said screw is mounted in a single thrust bearing in said jacket, and said screw projects downwardly in a substantially centered position in said tubular vessel free from further restraining bearing means.

4. The combination in accordance with claim 2 wherein said blade comprises a cobalt based alloy having a silicone coating.

5. The combination in accordance with claim 2 wherein the helical path defined by successive turns of said screw rotating in said tubular vessel has a substantially square cross-section designed in view of the operational parameters of said system, including the density, viscosity, and velocity of flow of said supply fluid, to produce turbulent flow of said supply fluid in said path which is characterized by a Reynolds number between 2000 and 10,000.

6. The combination in accordance with claim 1 in which the material of said tubular vessel and said baffles comprises copper.

7. The combination in accordance with claim 1 including means connected to said shaft for measuring the rotational torque of said shaft, and means connected to said shaft for measuring the rate of rotation of said shaft.

8. A combination in accordance with claim 1 including means for providing a seal between said tubular vessel and said shaft, means to connect an external source of pressurizing gas to said sealing means to maintain said sealing means under external pressure in excess of atmospheric pressure.

9. A cryogenic system for generating, storing, and handling slush hydrogen which comprises in combination:
 a source of helium gas,
 a source of liquid hydrogen feed,
 helium refrigeration means connected to said source of helium gas,
 hydrogen slush generating means comprising in combination heat exchanger means including an insulating jacket, an inner chamber having an inner heat transfer surface, and an intermediate chamber between said insulating jacket and said inner chamber for circulating helium refrigerant, said inner chamber connected to said source of liquid hydrogen feed, said intermediate chamber connected to said helium refrigeration means for deriving a stream of cold helium to refrigerate said inner heat transfer surface to a temperature below the melting point temperature of hydrogen whereby said liquid hydrogen is caused to form a frozen layer on said inner heat transfer surface, mechanical means associated with said inner chamber to loosen particles from said frozen layer, connecting means to said inner chamber for drawing off the slush formed by an aggregation of said particles, storage means at the termination of said connecting means, means to pump said liquid hydrogen feed from said source through said inner chamber to assist in discharging the slush hydrogen from said chamber, said pumping means and the configuration of said mechanical means in said inner chamber causing turbulent flow of the liquid hydrogen which serves to flush off particles clinging to the frozen layer, means to cool said hydrogen feed prior to pumping into said chamber comprising a heat exchanger, means to pass cold helium fluid through said exchanger to lower the temperature of said hydrogen prior to its introduction into said chamber.

10. The combination in accordance with claim 9 which includes means for connecting helium from said source to pressurize the seal of said slush generating means to maintain in said chamber a pressure in excess of atmospheric pressure.

11. The combination in accordance with claim 9 which includes an auxiliary source of hydrogen gas in addition to said source of helium gas, each of said sources of gas connectible to a common conduit system including appropriate valve cut-off means for alternatively providing streams of helium or hydrogen pressurizing gas to said storage means.

12. The combination in accordance with claim 11 wherein said common conduit system includes a pair of alternatively connectible paths, said first path passing through said liquid hydrogen bath and additional heat exchanger means for cooling said stream of pressurizing gas, and said second path by-passing said heat exchanger means, whereby pressurizing gas streams are alternatively provided to said storage means which may comprise relatively warm or cold hydrogen or relatively warm or cold helium.

13. The combination in accordance with claim 9 which includes means associated with the hydrogen slush product in said connecting and storage means for monitoring the quality of said hydrogen slush, said means comprising a source of a beam of radiation directed into said container to contact said slush, detecting means disposed to detect radiation emanating from said container resulting from said contacting beam, and calibrated recording means connected to said detecting means.

14. The combination in accordance with claim 9 wherein said mechanical means to loosen particles from said frozen layer comprises a screw rotatably mounted in said inner chamber, comprising a shaft and a blade helically wound around said shaft, and means for driving said shaft to rotate.

15. The combination in accordance with claim 9 further comprising means for recycling a portion of the hydrogen slush product from the storage means through said generating means.

References Cited

UNITED STATES PATENTS

| | | | |
|---|---|---|---|
| 2,449,730 | 9/1948 | Taylor | 62—354 |
| 2,575,374 | 11/1951 | Walsh | 62—354 |
| 2,902,839 | 9/1959 | Marshall | 62—354 |
| 2,943,845 | 7/1960 | Jaklitsch | 165—94 XR |
| 3,108,449 | 10/1963 | Lents | 62—136 XR |
| 3,230,737 | 1/1966 | Lunde | 62—354 |
| 3,212,283 | 10/1965 | Jackson et al. | 62—58 |
| 3,235,002 | 2/1966 | Bevarly et al. | 165—94 |
| 3,256,710 | 6/1966 | Dedricks | 62—354 XR |
| 3,319,436 | 5/1967 | Wilch | 62—354 XR |
| 3,354,662 | 11/1967 | Daunt | 62—10 |

WILBUR L. BASCOMB, JR., Primary Examiner

U.S. Cl. X.R.

62—354, 37, 10, 35, 40

UNITED STATES PATENT OFFICE
CERTIFICATE OF CORRECTION

Patent No. 3,521,458      Dated July 21, 1970

Inventor(s) Derk Th. A. Huibers, Russell A. Hemstreet and Howard K. Hover

It is certified that error appears in the above-identified patent and that said Letters Patent are hereby corrected as shown below:

Column 2, line 44, "thorugh" should read --through--.

Column 3, line 65, "shown" should read --show--.

Column 7, line 48, after 64a. the new sentence should start with --A--.

Column 7, line 75, "86" should read --68--.

Column 10, line 63, "frigerator" should read "--frigeration--.

Column 10, line 71, the word "it" should read --it's--.

Column 16, line 19, "shaid" should read --said--.

Column 18, line 1, "said liquid hydrogen bath and" was cancelled by amendment dated December 23, 1968.

SIGNED AND
SEALED
OCT 20 1970

(SEAL)
Attest:

Edward M. Fletcher, Jr.
Attesting Officer

WILLIAM E. SCHUYLER, JR.
Commissioner of Patents